United States Patent Office 3,372,078
Patented Mar. 5, 1968

3,372,078
PROCESS FOR MANUFACTURING RUBBER STRIPS
TO BE USED IN PNEUMATIC TIRES
Fulcieri Fausti, Bollate, Milan, and Angelo Morando, Milan, Italy, assignors to Pirelli, S.p.A., Milan, Italy
No Drawing. Filed Nov. 21, 1963, Ser. No. 325,445
Claims priority, application Italy, Dec. 5, 1962, 23,927/62
4 Claims. (Cl. 156—306)

ABSTRACT OF THE DISCLOSURE

A partially cured rubber insert for use in the manufacture of tires is prepared by superimposing two different rubber layers, each containing vulcanizing agents, moderately heating the superimposed layers to cause migration of the vulcanizing agents to the contact zone between the layers so that the inner portion of the resulting unit is cured while the outer portions of the unit remain uncured. The uncured portions of the unit are subsequently cured during the tire manufacturing process.

---

In the production of a pneumatic tire it has been found that it is difficult to obtain, in certain portions of the tire the thickness of rubber that is necessary for a satisfactorily serviceable tire. This problem occurs during vulcanization when high compression stresses develop in certain portions of the tire and displace the rubber, while it is still in a plastic state, towards other portions where the stresses are less intense. Examples of the affected portions are the parts of the beads which bear against the rim flanges or, in the case of a carcass made of a material which shrinks under heat action, the portion inside the innermost carcass ply. In these cases the result is that the fabrics (the chafers and the inner ply, respectively) are deprived of a necessary protective rubber layer.

In the production of pneumatic tires, various attempts have been made to solve this problem, in the bead portions patricularly, by using partially cured strips of rubber compound. These strips are less likely to soften from the action of heat and therefore are not displaced by the stresses referred to above. However, this solution of the problem is unsatisfactory since the vulcanization of the strips, though partial, deprives them of the surface tackiness necessary for their bonding to the other components of the tire. Accordingly, the partially cured strips create problems as regards their connection to the other components of the tire.

The applicants have discovered that the problem can be completely solved by using a particular type of semi-finished element in those portions of the pneumatic tire where adequate thickness is needed. This element being in the form of a strip of rubber compound having a cured inner portion and uncured outer surfaces. As a result, the cured inner portion provides a satisfactory mechanical resistance, while the uncured surfaces provide the necessary bonding of the strips with the other elements of the tire.

The present invention is directed to a novel process particularly advantageous for manufacturing strips as described above.

Briefly summarized the present invention provides a process for the manufacture of rubber strips for pneumatic tires, which comprises, first superimposing two layers of rubber compound each containing a group of vulcanizing agents. The vulcanizing agents contained in each layer should be sufficient, when all are present at the same time, to effect vulcanization even under a low heat treatment, whereas the individual groups should be insufficient, in themselves, to cause vulcanization under the same low heat treatment, but still sufficient to vulcanize under a higher heat treatment. The unit of the two layers is then subjected to a heating action. When the inner part of said unit has been cured, but before the outer surfaces are cured, the heating step is terminated.

After the first step of this process has been carried out, and then the unit is subjected to heat treatment, it has been found that vulcanization first takes effect from the inside, and more particularly from contact surfaces between the two layers. In fact, in the contact zone between said two layers, migration phenomena of the vulcanizing agents occur, which creates a barrier layer adjacent the contact surfaces. This barrier or third layer contains all the agents needed to effect a rapid cure.

The invention will be more clearly understood from the following example:

According to the process forming the object of the present invention, a rubber strip for pneumatic tires can be manufactured by superimposing two layers of rubber compound, each having a thickness of 1 mm., one prepared according to Formula A and the other according to Formula B.

|  | A | B |
|---|---|---|
| SBR 1500 | 100 | 100 |
| Zinc oxide | 5 | 5 |
| HAF Black | 50 | 50 |
| Plasticizers | 5 | 5 |
| Anti-oxidants | 2 | 2 |
| Stearic acid | 3 | 3 |
| Mercapto-benzo-thiazole | 1 | --- |
| Diphenylguanidine | --- | 1 |
| Sulphur | 2 | 2 |

The unit is subjected to a heat of 120° C. for approximately ten minutes. After this treatment, because of the migration phenomena of the respective groups of vulcanizing agents the strip will be constituted by a cured barrier or central layer having a thickness of about 0.5 mm. and by uncured outer layers.

The resulting strip can be applied to a pneumatic tire, during its manufacture, in the bead zone, for example. Then, when the tire itself is cured, for instance for forty minutes at 140° C., the outer layers will be completely cured.

The scope of the present invention obviously includes any other form of realization deriving from the above indicated inventive principle and, in particular, it is understood that the above given example is not a limiting one, since it is possible to use two compounds having other combinations of vulcanizing agents as long as the respective compounds include vulcanizing agents which, when all are present at the same time, substantially increase the curing rate as compared to a condition in which the vulcanizing agents of only one compound are present.

What is claimed is:

1. A process for the manufacture of rubber strips for pneumatic tires of vehicle wheels, comprising; the step of superimposing two layers of rubber compositions, each composition containing a group of vulcanizing agents, the agents contained in the two compositions being sufficient, when all present at the same time, to cause vulcanization under a weak heat treatment, each group of agents by itself being incapable of causing vulcanization under the same weak heat treatment but nevertheless capable of causing vulcanization under a higher heat treatment; the step of subjecting a unit comprising the superimposed layers to a weak heating action to cause migration of the vulcanizing agents in the layers towards the contact surfaces between the layers and to cure the inner part of the unit; and the step of stopping the heating action when the inner part of the unit is cured but before the outer surfaces of said unit are cured.

2. The process of claim 1, wherein the unit is subjected to a heat of 120° C. for approximately ten minutes during said weak heating action.

3. A process according to claim 1, wherein the unit is applied to rubbery material for forming a pneumatic tire, and further comprising vulcanizing said material together with the uncured outer surfaces of said unit.

4. A process according to claim 1, wherein the two superimposed layers each having a thickness of about 1 mm., and wherein the weak heating action is stopped when the cured inner part of the unit has a thickness of about 0.5 mm.

References Cited

UNITED STATES PATENTS

| | | | |
|---|---|---|---|
| 844,820 | 2/1907 | Marks | 156—128 |
| 1,211,351 | 1/1917 | Price | 156—110 |
| 1,488,343 | 3/1924 | Hoffman | 156—128 |
| 1,519,545 | 12/1924 | Marquette | 156—128 |
| 2,803,283 | 8/1957 | Gruber | 152—367 |
| 2,822,026 | 2/1958 | Willis | 156—135 |
| 2,855,014 | 7/1958 | Gruber | 152—367 |
| 2,979,111 | 4/1961 | Schutz | 156—135 X |

OTHER REFERENCES

Whitby, C.C. Synthetic Rubber, N.Y., John Wiley and Sons, 1954, p. 394.

EARL M. BERGERT, *Primary Examiner.*

C. B. COSBY, *Examiner.*